(12) United States Patent
Oishi et al.

(10) Patent No.: US 8,904,795 B2
(45) Date of Patent: Dec. 9, 2014

(54) NOISE REDUCING DEVICE AND JET PROPULSION SYSTEM

(75) Inventors: Tsutomu Oishi, Hanno (JP); Yoshinori Oba, Tokorozawa (JP)

(73) Assignee: IHI Corporation (JP)

( * ) Notice: Subject to any disclaimer, the term of this patent is extended or adjusted under 35 U.S.C. 154(b) by 140 days.

(21) Appl. No.: 12/918,899

(22) PCT Filed: Feb. 25, 2009

(86) PCT No.: PCT/JP2009/053386
§ 371 (c)(1),
(2), (4) Date: Aug. 23, 2010

(87) PCT Pub. No.: WO2009/107646
PCT Pub. Date: Sep. 3, 2009

(65) Prior Publication Data
US 2011/0000181 A1   Jan. 6, 2011

(30) Foreign Application Priority Data

Feb. 25, 2008 (JP) .............................. P2008-042656

(51) Int. Cl.
| | | |
|---|---|---|
| F02C 7/24 | (2006.01) | |
| B64D 27/18 | (2006.01) | |
| B64C 7/02 | (2006.01) | |
| F02K 3/06 | (2006.01) | |
| F02K 1/44 | (2006.01) | |
| F02K 1/46 | (2006.01) | |
| F02K 1/34 | (2006.01) | |

(52) U.S. Cl.
CPC .............. *F02K 3/06* (2013.01); *F05D 2260/96* (2013.01); *B64D 27/18* (2013.01); *B64C 7/02* (2013.01); *F02K 1/44* (2013.01); *F02K 1/46* (2013.01); *F02K 1/34* (2013.01)
USPC ............. 60/725; 60/226.3; 60/226.1; 60/231; 60/263; 239/265.19; 239/265.11; 239/265.23; 244/1 R; 244/1 N; 244/1 A; 244/1 TD; 181/220

(58) Field of Classification Search
USPC ........... 60/208, 211, 230, 231, 770, 262–264, 60/226.3, 204, 226.1, 725; 239/265.19, 239/265.11, 265.17, 265.23, 265.29, 239/265.31; 181/220; 244/1 R, 1 N, 1 A, 244/1 TD
See application file for complete search history.

(56) References Cited

U.S. PATENT DOCUMENTS 5,092,425 A    3/1992  Shaw, Jr. ..................... 181/213
6,679,048 B1 *  1/2004  Lee et al. ..................... 60/204
(Continued)

FOREIGN PATENT DOCUMENTS

EP          0 329 211          8/1989
(Continued)

OTHER PUBLICATIONS

Supplementary Search Report dated Apr. 16, 2012 issued in corresponding European Patent Application No. 09715023.9 (6 pages).

(Continued)

*Primary Examiner* — Craig Kim
(74) *Attorney, Agent, or Firm* — Ostrolenk Faber LLP

(57) ABSTRACT

A noise reducing device in a jet engine that has a cylindrical casing, a cylindrical partition wall that is inserted in the casing while protruding partially from a trailing edge of the casing, and a compressor that compresses air that is taken into the cylindrical partition wall, with the inside of the cylindrical partition wall serving as a duct in which a core stream of high-speed air flows, and the space between the cylindrical partition wall and the casing serving as a duct in which a bypass stream of low-speed air flows, and being connected with a wing of an airplane by a pylon that has a projection portion that extends beyond the casing to the downstream of the core stream and the bypass stream, the noise reducing device includes a nozzle, disposed at the pylon on the downstream of the core stream, that injects a fluid toward a noise generation source that is produced from the mutual approach of an ambient air stream that is produced outside of the bypass stream and the core stream.

4 Claims, 6 Drawing Sheets

(56) References Cited

U.S. PATENT DOCUMENTS

| | | | |
|---|---|---|---|
| 7,159,383 B2 * | 1/2007 | Barton et al. | 60/226.1 |
| 7,246,481 B2 | 7/2007 | Gutmark et al. | 60/204 |
| 7,950,218 B2 * | 5/2011 | Beutin et al. | 60/231 |
| 2003/0182925 A1 | 10/2003 | Lair | 60/226.1 |
| 2004/0187474 A1 | 9/2004 | Martens et al. | 60/204 |
| 2004/0237501 A1 | 12/2004 | Brice et al. | 60/204 |
| 2012/0001022 A1 * | 1/2012 | Morvant et al. | 244/1 N |
| 2012/0068011 A1 * | 3/2012 | Thomas et al. | 244/1 N |

FOREIGN PATENT DOCUMENTS

| | | |
|---|---|---|
| EP | 1 418 331 A2 | 5/2004 |
| EP | WO 2008/100712 A2 | 8/2008 |
| FR | 2 901 321 | 11/2007 |
| GB | 1 209 723 | 10/1970 |
| GB | 2 203 710 A | 10/1988 |
| JP | 2003-172205 | 6/2003 |
| JP | 2003-172205 | 6/2003 |
| JP | 2005-207422 | 8/2005 |
| JP | 2005-207422 | 8/2005 |

OTHER PUBLICATIONS

Office Action dated Jul. 31, 2013 issued in corresponding European Patent Application No. 09715023.9.

B. Greska and a. Krothapalli, "Jet Noise Reduction Using Aqueous Microjet Injection", AIAA Aeroacoustics Conference, AIAA 2004-2971.

Craig A. Hunter et al. "Computational Analysis of the Flow and Acoustic Effects of Jet-Pylon Interaction", AIAA Aeroacoustics Conference, AIAA 2005-3083.

V.H. Arakeri et al., "On the use of microjets to suppress turbulence in a Mach 0.9 axisymmetric jet", J Fluid Mech. (2003), vol. 490, pp. 75-98.

International Search Report and Written Opinion mailed Jun. 2, 2009 in corresponding PCT International Application No. PCT/JP2009/053386.

Steven J. Massey et al., "Computational Analyses of Propulsion Aeroacoustics for Mixed Flow Nozzle Pylon Installation at Takeoff," NASA/CR-2001-211-56, Sep. 2001.

Brenton Greska et al. "The Effects of Microjet Injection on an F404 Jet Engine," AIAA 2005-3047, 11th AIAA/CEAS Aeroacoustics Conference (26th AIAA Aeroacoustics Conference), 23-25 May 2005, Monterey, California.

* cited by examiner

LOW-SPEED ←——→ HIGH-SPEED

US 8,904,795 B2

NOISE REDUCING DEVICE AND JET PROPULSION SYSTEM

CROSS-REFERENCE TO RELATED APPLICATIONS

The present application is a 35 U.S.C. §§371 national phase conversion of PCT/JP2009/053386, filed Feb. 25, 2009, which claims priority of Japanese Patent Application No. 2008-042656, filed Feb. 25, 2008, the contents of which are incorporated herein by reference. The PCT International Application was published in the Japanese language.

TECHNICAL FIELD

The present invention relates to a noise reducing device for a jet engine and to a jet propulsion system.

Priority is claimed on Japanese Patent Application No. 2008-42656, filed Feb. 25, 2008, the content of which is incorporated herein by reference.

BACKGROUND ART

A jet engine for an aircraft is constituted by the successive arrangement of a fan that takes in air, a compressor that takes in and compresses a portion of the air that the fan has taken in, a combustor that mixes the air that the compressor has compressed and fuel and causes a combustion, and a turbine that drives the fan and the compressor with the combustion gas of the combustor.

The compressor, the combustor and the turbine are allocated in a cylindrical partition wall, and the fan is allocated in the upstream of the cylindrical partition wall. A large portion of the air that the fan takes in passes along a bypass duct that is provided in a space which exists between the cylindrical partition wall and a casing that covers the outer periphery of the cylindrical partition wall. The air that passes through this bypass duct (bypass stream) is discharged so as to surround the outer circumference of the exhaust air of the turbine (core stream), and merges with the core stream.

The region where this core stream and bypass stream merge serves as a noise generation source, leading to the generation of noise. In order to reduce this noise, it has been proposed to have a plurality of pyramidal bodies arranged on a downstream end portion of a cylindrical partition wall to guide a portion of the high-speed core stream and the low-speed bypass stream in mutually different directions, and efficiently mix the fluids that flow on the inner side and the outer side of the cylindrical partition wall (for example, refer to Patent Document 1 and Non-Patent Document). Thereby, the core stream and the bypass stream are suitably mixed by the generation of a vortex, and it is possible to reduce the noise.

However, since the pyramidal bodies are permanently fixed to the cylindrical partition wall, the core stream and the bypass stream end up being mixed not only at the time of takeoff but during cruising as well, and thus more than needed, leading to the problem of a reduction in thrust during cruising. Therefore, it has been proposed to arrange nozzles on the cylindrical partition wall, and by suitably injecting air toward the merging portion of the core stream and the bypass stream, the mixture state is adjusted (for example, refer to Non-Patent Document 2).

Jet engines are mounted to airplane wings via a pylon.

In the downstream region of this pylon, as shown in FIG. 6, the core stream X is deflected by turbulence in the bypass stream Y so that a low-speed ambient air stream Z that is further outside the core stream X and the bypass stream Y approaches. At this time, since the speed differential between the core stream X and the ambient air stream Z is large, a high shearing stress region with rapid fluctuations in speed is produced in the boundary region, and thus serves as another noise generation source in addition to the aforementioned noise generation source.

[Patent Document 1] Japanese Unexamined Patent Application, First Publication No. 2003-172205

[Non-Patent Document 1] Steven J. Massey et al., "Computational Analyses of Propulsion Aeroacoustics for Mixed Flow Nozzle Pylon Installation at Takeoff", NASA/CR-2001-211-56, September 2001.

[Non-Patent Document 2] Brenton Greska et al., "The Effects of Microjet Injection on an F404 Jet Engine", AIAA 2005-3047, 11th AIAA/CEAS Aeroacoustics Conference (26th AIAA Aeroacoustics Conference), 23-25 May 2005.

Accordingly, in the nozzles disclosed in Non-Patent Document 2 above, it is not possible to reduce the noise from the aforementioned new noise generation source, and the noise reduction effect is insufficient.

The present invention was achieved in view of the above circumstances, and has as its object to provide a noise reducing device for a jet engine and a jet propulsion system that can reduce the noise that is produced as a result of the jet engine being connected to the wing of an airplane by a pylon.

DISCLOSURE OF THE INVENTION

The present invention adopts the following means in order to solve the aforementioned problems.

The noise reducing device of the present invention is a noise reducing device in a jet engine that has a cylindrical casing, a cylindrical partition wall that is inserted in the casing while protruding partially from a trailing edge of the casing, and a compressor that compresses air that is taken into the cylindrical partition wall, with the inside of the cylindrical partition wall serving as a duct in which a core stream of high-speed air flows, and the space between the cylindrical partition wall and the casing serving as a duct in which a bypass stream of low-speed air flows, and being connected with a wing of an airplane by a pylon that has a projection portion that extends beyond the casing to the downstream of the core stream and the bypass stream, the noise reducing device includes a nozzle, disposed at the pylon on the downstream of the core stream, that injects a fluid toward a noise generation source that is produced from the mutual approach of an ambient air stream that is produced outside of the bypass stream and the core stream.

The present invention can inject a fluid from the nozzle toward a mixing layer that is a noise generation source that is produced by the mutual approach of the core stream and the ambient air stream, which have a large speed differential downstream of the pylon, and by dispersing turbulence of the mixing layer, can reduce the noise that is caused by the turbulence in the mixing layer.

Also, in the noise reducing device of the present invention, the nozzle is arranged on the downstream end portion of the projection portion of the pylon.

This invention can reliably inject a fluid in the noise generation source that is produced at a position near the downstream end portion of the projection portion of the pylon, and can more preferably disperse the mixing layer.

Also, in the noise reducing device of the present invention, the nozzle is arranged at the opposing portion to the engine rotational central axis in the projection portion of the pylon.

This invention can reliably inject a fluid into the noise generation source even from the aforementioned opposing portion in the projection portion of the pylon, and can more preferably disperse the mixing layer.

Also, in the noise reducing device of the present invention, the nozzle is arranged on the downstream end portion of the cylindrical partition wall in the vicinity of the pylon.

This invention, even if the nozzle is not arranged on the pylon, can inject a fluid from the downstream end portion of the cylindrical partition wall, and can disperse the turbulence in the mixing layer.

Also, in the noise reducing device of the present invention, the fluid that is injected from the nozzle is air that is supplied from the compressor to the nozzle.

This invention can inject air that is compressed to the noise generation source, and can more preferably disperse the mixing layer.

The jet propulsion system of the present invention is provided with a jet engine having a cylindrical casing, a cylindrical partition wall that is inserted in the casing while protruding partially from a downstream end portion of the casing, a compressor that compresses air that is taken into the cylindrical partition wall, with the inside of the cylindrical partition wall serving as a duct in which a high-speed core stream flows, and the space between the cylindrical partition wall and the casing serving as a duct in which a low-speed bypass stream flows; a pylon that has a projection portion that extends beyond the casing to the downstream of the core stream and the bypass stream to connect the casing and a wing of an airplane; and the noise reducing device of the present invention.

Effect of The Invention

According to the present invention, it is possible to favorably reduce the noise produced by the connection of a jet engine to a wing of an airplane via a pylon.

Figure 1:
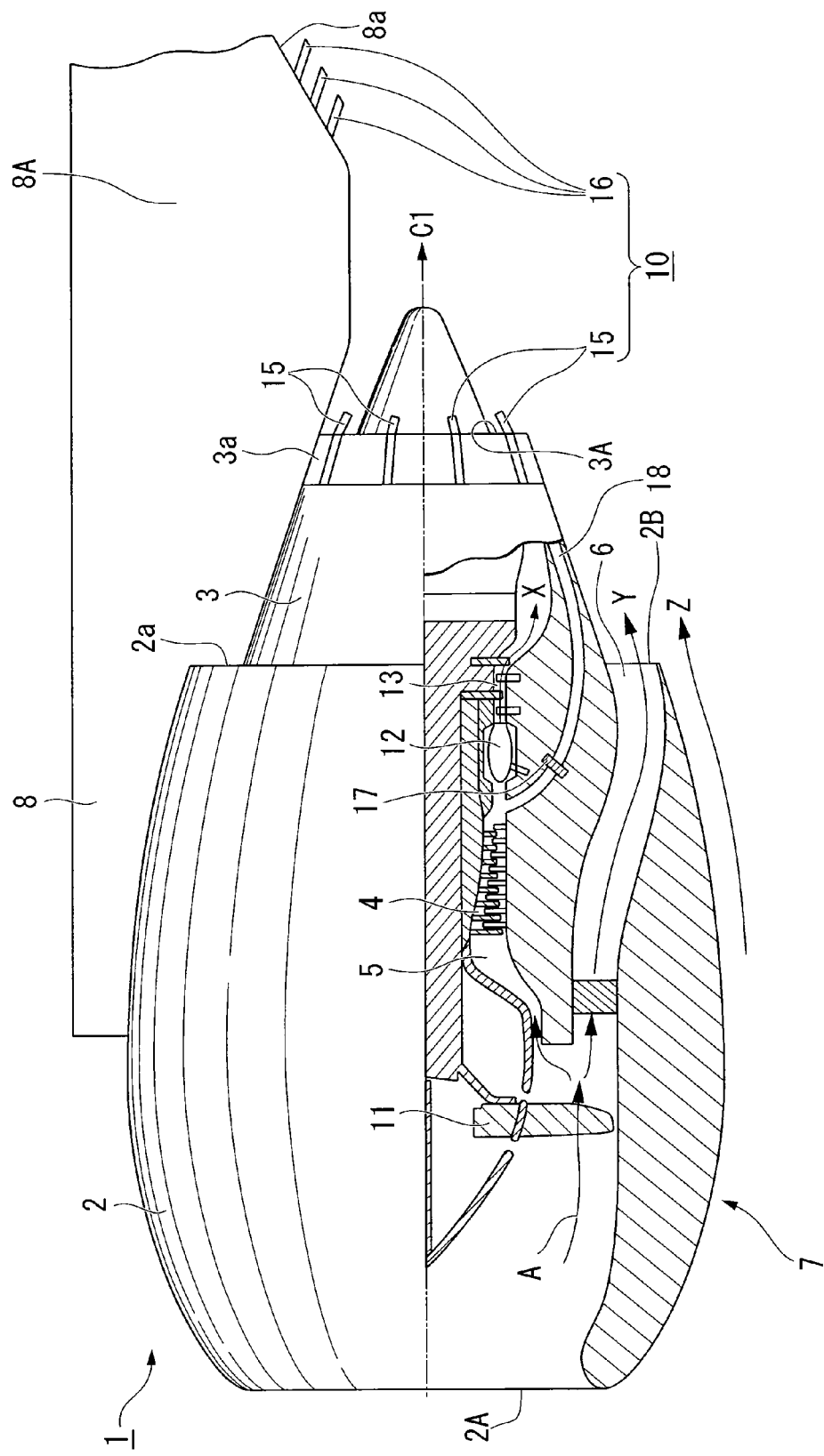
FIG. 1 is a schematic cross-sectional drawing that shows the schematic configuration of the jet propulsion system and the noise reducing device of the first embodiment of the present invention.

BRIEF DESCRIPTION OF REFERENCE NUMERALS 1, 20, 22 jet propulsion system
2 casing
2a trailing edge
3 cylindrical partition wall
4 compressor
5, 6 ducts
7 jet engine
8 pylon
8A projection portion
8a downstream end portion
8b opposing portion
10, 21, 23 noise reducing device
15 microjet nozzle
16 pylon-caused noise reducing nozzle (nozzle)

Best Mode for Carrying out the Invention

A first embodiment of the present invention shall be described with reference to FIG. 1 and FIG. 2.

Figure 2:
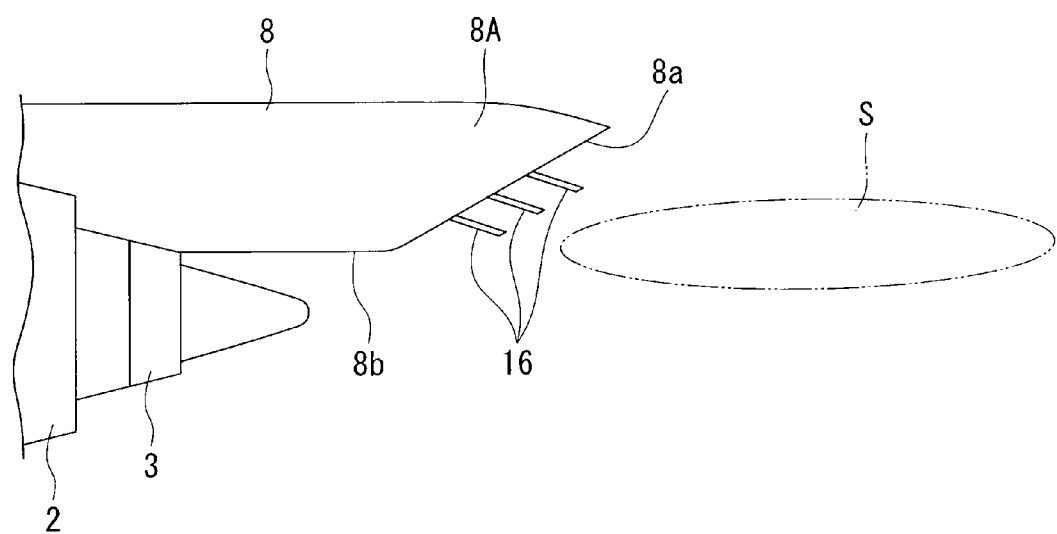
FIG. 2 is an explanatory drawing that shows the relationship between the jet propulsion system and the noise reducing device of the first embodiment of the present invention and the mixing layer that is a noise generation source.

A jet propulsion system 1 according to the present embodiment, as shown in FIG. 1, is provided with a jet engine 7 that has a cylindrical casing 2, a cylindrical partition wall 3 that is inserted in the casing while protruding partially from a trailing edge 2a of the casing 2, and a compressor 4 that compresses air that is taken into the cylindrical partition wall 3, with the inside of the cylindrical partition wall 3 serving as a duct 5 in which a high-speed core stream X flows, and the space between the cylindrical partition wall 3 and the casing 2 serving as a duct 6 in which a low-speed bypass stream Y flows, a pylon 8 that has a projection portion 8A that extends beyond the casing 2 to the downstream of the core stream X and the bypass stream Y to connect the casing 2 and the wing of an airplane not illustrated, and a noise reducing device 10.

The jet engine 7 is provided with a fan 11, a compressor 4, a combustor 12, and a turbine 13, which are successively arrange along the central axis line C1 from the upstream to the downstream.

The opening on the upstream of the casing 2 serves as an air intake 2A that takes in air A.

The opening on the downstream of the casing 2 serves as a bypass stream discharge outlet 2B that discharges the bypass stream Y. Of the air A that is taken in from the air intake 2A, the bypass stream Y consists of the air A that is not taken into the compressor 4, and is a low-speed fluid that flows between the cylindrical partition wall 3 and the casing 2.

The core stream X is a fluid that is exhausted from the turbine 13 and flows in the cylindrical partition wall 3, and is a fluid of a higher speed than the bypass stream Y. The opening on the downstream of the cylindrical partition wall 3 serves as a core stream discharge outlet 3A that discharges this core stream X. The ambient air stream Z is a low-speed fluid that flows on the outer side of the bypass stream Y, along the outer side of the casing 2.

The casing 2 and the cylindrical partition wall 3 of the jet engine 7 both consist of cylindrical members. The casing 2 forms the outer shape of the jet engine 7, and covers the outer periphery of the cylindrical partition wall 3.

The cylindrical partition wall 3 is arranged shifted somewhat downstream along the direction of the central axis line C1 with respect to the casing 2, and defines the duct 5 in which the core stream X flows and the duct 6 in which the bypass stream Y flows.

The fan 11 is disposed upstream of the cylindrical partition wall 3, in the vicinity of the upstream end portion in the casing 2, and takes in the air A from the outside. The compressor 4 is disposed in the vicinity of the upstream end portion in the cylindrical partition wall 3, and takes in and compresses a portion of the air A that the fan 11 has taken in.

The combustor 12 is arranged on the downstream of the compressor 4 in the cylindrical partition wall 3, and mixes fuel with the air A that the compressor 4 has compressed, combusts the mixture, and discharges the combustion gas. The turbine 13 is arranged on the downstream of the combustor 12 in the cylindrical partition wall 3, and drives the fan 11 and the compressor 4 by the combustion gas that the combustor 12 discharges.

The pylon 8 is a member that extends in a direction perpendicular to the central axis line C1 of the casing 2 and the cylindrical partition wall 3, and supports the downstream end portions of the casing 2 and the cylindrical partition wall 3 from the outside. The pylon 8 has a projection portion 8A that extends further to the downstream than the casing 2, and it is arranged so as to project downward from the wing of an airplane not shown, and supports the jet engine 7 in a suspending manner.

A noise reducing device 10 is provided with a plurality of microjet nozzles 15 that are arranged at the downstream end portion 3a of the cylindrical partition wall 3, and a plurality of pylon-caused noise reducing nozzles (nozzles) 16 that are disposed on the downstream end portion 8a of the projection portion 8A of the pylon 8.

Each microjet nozzle 15 and the compressor 4 are connected by a supply channel 18 in which a valve 17 is disposed midway, and so a portion of the air that is discharged from the compressor 4 is injected from the microjet nozzle 15. The plurality of microjet nozzles 15 are arranged on the downstream end portion 3a of the cylindrical partition wall 3 in the state of being separated by a predetermined interval in the circumferential direction, so as to inject the air toward the region where the core stream X and the bypass stream Y merge.

Figure 7:
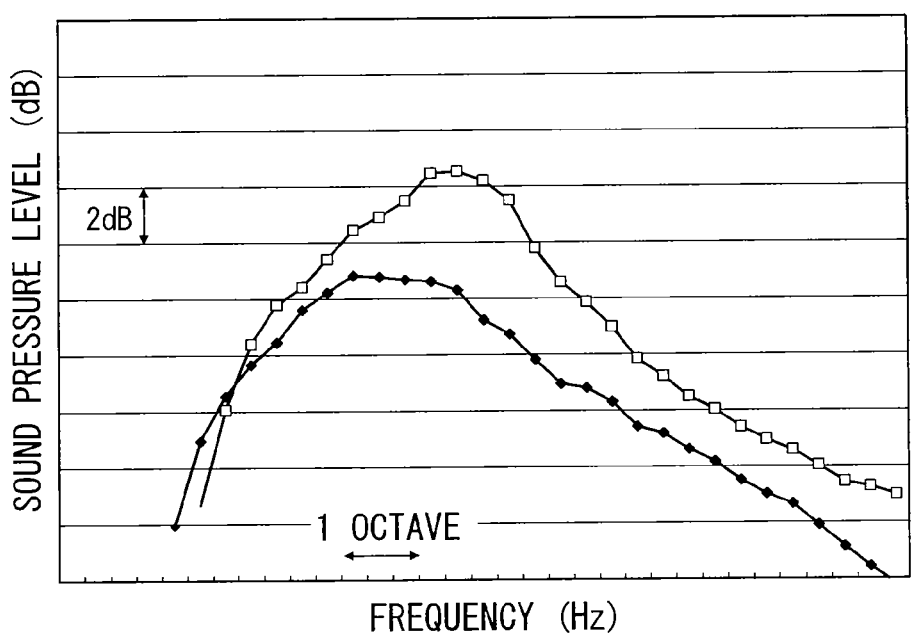
FIG. 7 is a graph that shows the difference in sound pressure levels generated by the noise generation source.

Similarly to the microjet nozzles 15, the pylon-caused noise reducing nozzles 16 are connected with supply channels not shown that are connected to the compressor 4, whereby a portion of the air that is discharged from the compressor 4 is injected. The plurality of the pylon-caused noise reducing nozzles 16 are arranged in the vicinity of the downstream end portion 8a of the projection portion 8A of the pylon 8 so as to inject air toward a mixing layer (noise generation source) S shown in FIG. 2 that is produced by the mutual approach of the core stream X and the ambient air stream Z that occurs on the outside of the bypass stream Y. Note that the aforementioned mixing layer (noise generation source) S refers to the location where, when measuring the noise level (sound pressure level) in the vicinity of the jet engine 7 at each frequency, the difference in sound pressure level between the case of the jet engine 7 being attached to a wing of an airplane via the pylon 8, and the case of it being attached without the pylon 8 is above a predetermined level. FIG. 7 is an example of a sound pressure level measurement result that shows the sound pressure level for the case of a pylon (□) being as much as 4 dB greater than the case of no pylon (♦) in the vicinity of the jet engine 7 due to the effect of the mixing layer (noise generation source) S.

Next, the operation of the jet propulsion system 1 and the noise reducing device 10 according to the present invention shall be described.

During the takeoff of an airplane, first the air A is taken in from the air intake 2A by the rotation of the fan 11. A portion of this air A is compressed by the compressor 4, mixed with fuel by the combustor 12, and combusted. Drive power of the fan 11 and the compressor 4 is generated in the turbine 13 by the combustion gas that is discharged from the combustor 12. Thereafter, the fan 11 rotates and the air A is taken in by the drive power that is generated by the turbine 13.

By the aforementioned operation, the core stream X flows in the duct 5 in the cylindrical partition wall 3 and is discharged from the core stream discharge outlet 3A. Also, the bypass stream Y flows in the duct 6 between the cylindrical partition wall 3 and the casing 2, and is discharged from the bypass stream discharge outlet 2B. At this time, thrust is obtained, and the airplane takes off.

At this time, by opening the valve 17, air is injected from each of the microjet nozzles 15 and the pylon-caused noise reducing nozzles 16. The air that is injected from the microjet nozzles 15 reaches the region where the discharged core stream X and the bypass stream Y merge, and is made to favorably mix with both. In this way, the noise that is produced by the merging of the core stream X and the bypass stream Y is reduced.

Meanwhile, the air that is injected from the pylon-caused noise reducing nozzles 16 reaches mixing layer S from the downstream end portion 8a of the projection portion 8A of the pylon 8, thereby causing the turbulence of the mixing layer S to spread. At this time, the air amount is suitably adjusted by the valve 17, in accordance with the operation state of the jet engine 7. In this way, the noise caused by the turbulence in the mixing layer S is reduced.

When the airplane has reached a predetermined altitude, the injection of air from the microjet nozzles 15 and the pylon-caused noise reducing nozzles 16 is stopped by closing the valve 17, and a predetermined cruising state is ensured.

According to this jet propulsion system 1 and the noise reducing device 10, since air from the pylon-caused noise reducing nozzles 16 is injected toward the mixing layer S, which is the noise generation source that is produced by the mutual approach of the core stream X and the ambient air stream Z that have a large velocity differential downstream of the pylon 8, it is possible to disperse the turbulence of the mixing layer S, and reduce the noise caused by the turbulence in the mixing layer S. Accordingly, it is possible to favorably reduce the noise produced by the connection of the jet engine 7 to the wing of an airplane via the pylon 8.

In particular, since the pylon-caused noise reducing nozzles 16 are arranged on the downstream end portion 8a of the projection portion 8A of the pylon 8, it is possible to reliably inject air into the mixing layer S, which is the noise generation source that occurs at a position near the downstream end portion 8a of the projection portion 8A of the pylon 8, it is possible to more favorably disperse the mixing layer S.

Also, since the air that is injected from the pylon-caused noise reducing nozzles 16 is supplied from the compressor 4, it is possible to inject compressed air into the mixing layer S, which is the noise generation source, and it is possible to more favorably disperse the mixing layer S.

Figure 3:
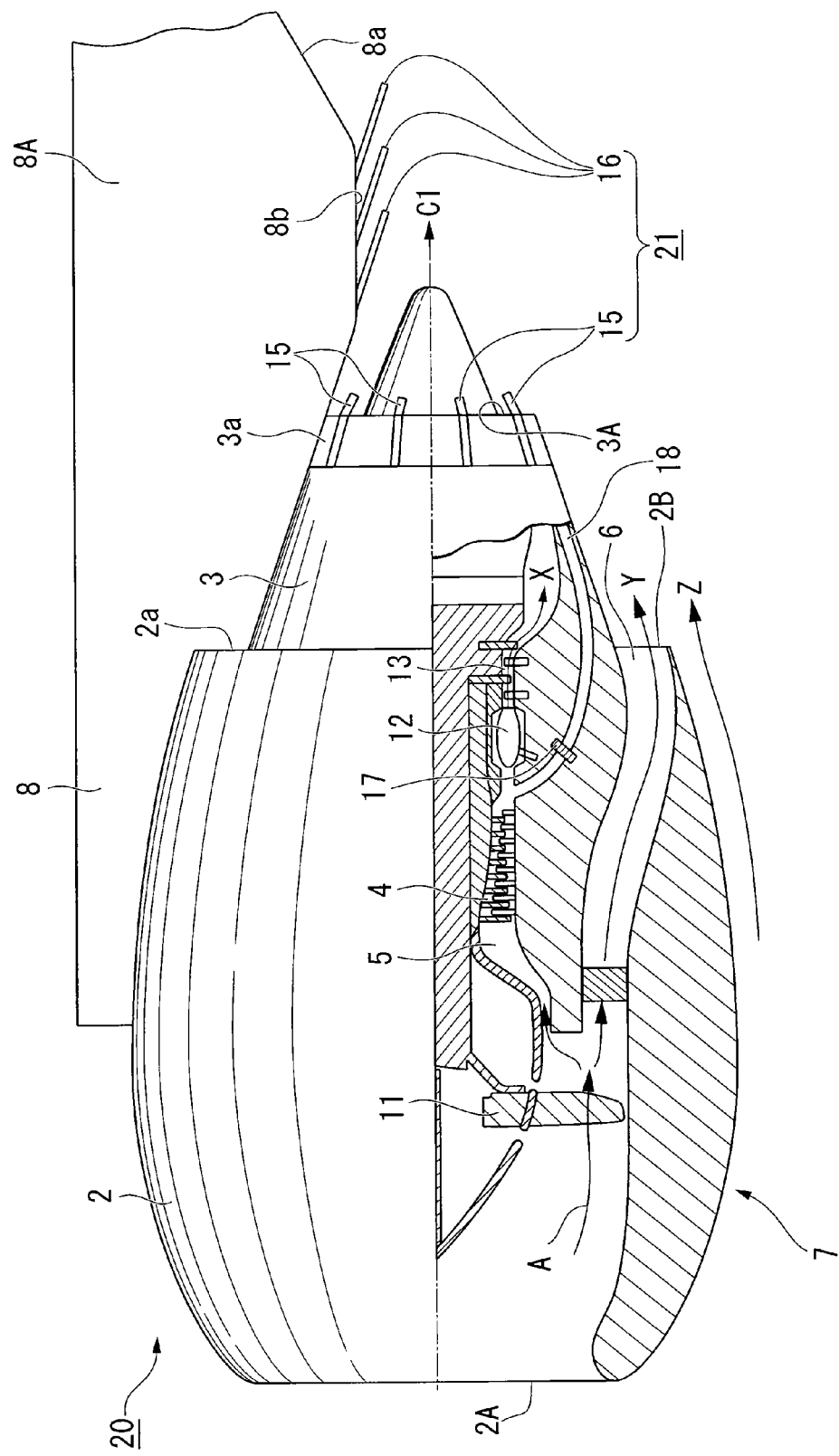
FIG. 3 is a schematic cross-sectional drawing that shows the schematic configuration of the jet propulsion system and the noise reducing device of the second embodiment of the present invention.

Next, a second embodiment shall be described with reference to FIG. 3.

Note that those constituent elements that are the same as in the first embodiment above are denoted by the same reference numerals, and descriptions thereof are omitted.

The second embodiment and the first embodiment differ on the point of the pylon-caused noise reducing nozzles 16 of a jet propulsion system 20 and a noise reducing device 21 being arranged on an opposing portion 8b to the cylindrical partition wall 3 (engine rotational central axis) in the projection portion 8A of the pylon 8.

The distal end of each pylon-caused noise reducing nozzle 16 is oriented from the opposing portion 8b to the mixing layer S in the same manner as the first embodiment.

According to the jet propulsion system 20 and the noise reducing device 21, even from the aforementioned opposing portion 8b in the projection portion 8A of the pylon 8, it is possible to reliably inject air into the mixing layer S that is the noise generation source, and it is possible to more favorably disperse the mixing layer S.

Figure 4:
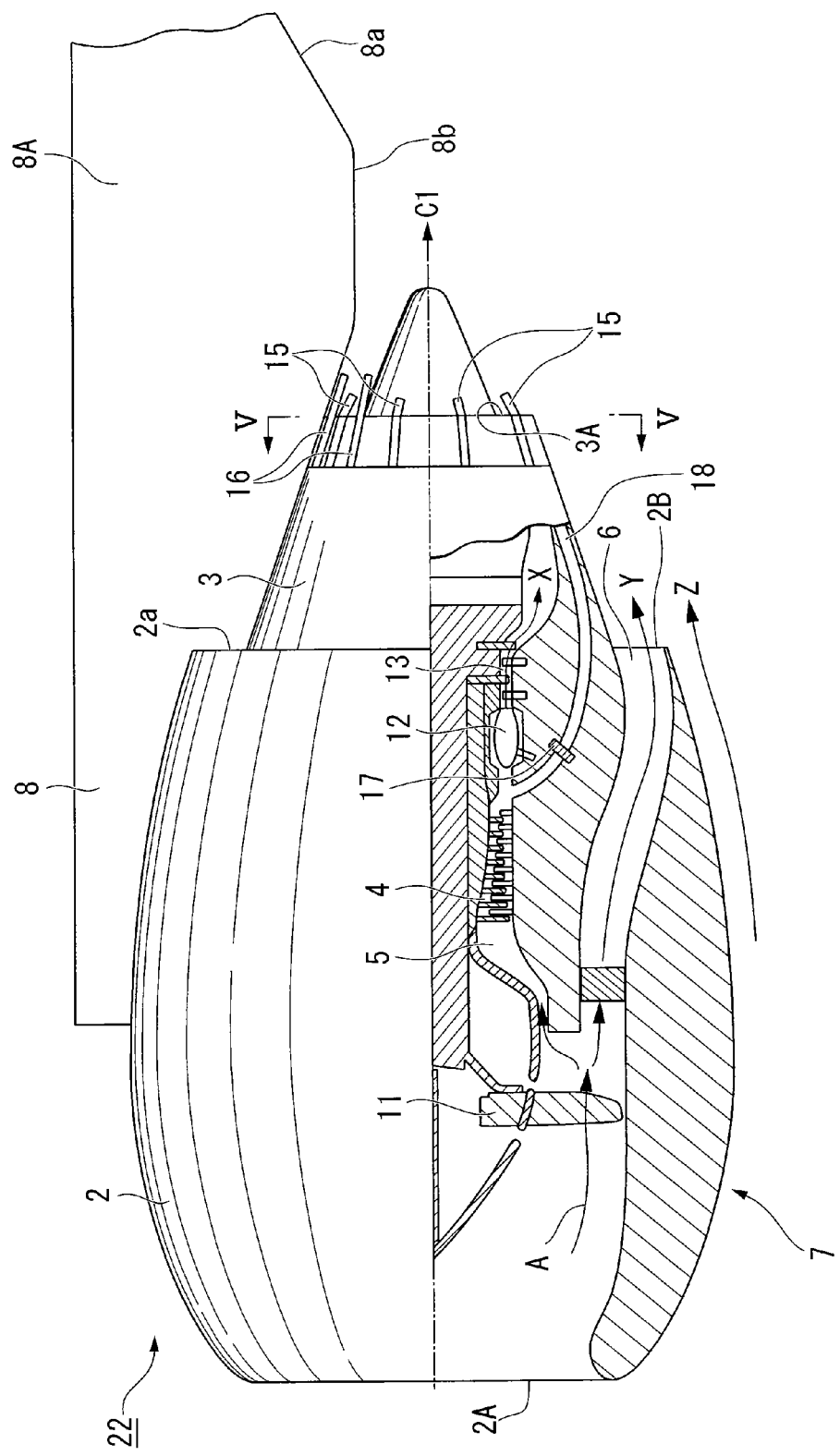
FIG. 4 is a schematic cross-sectional drawing that shows the schematic configuration of the jet propulsion system and the noise reducing device of the third embodiment of the present invention.
Figure 5:
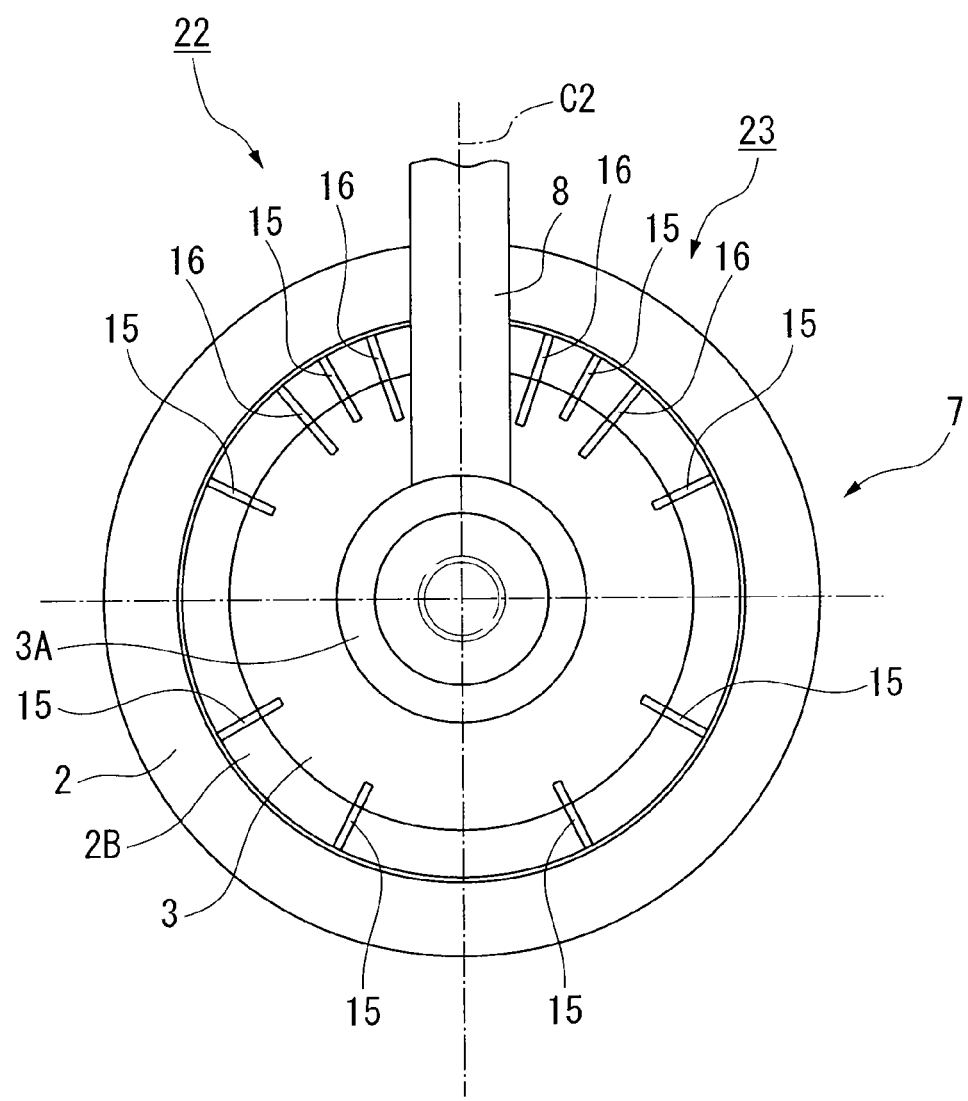
FIG. 5 is a cross-sectional view along lines V-V of FIG. 4.
Figure 6:
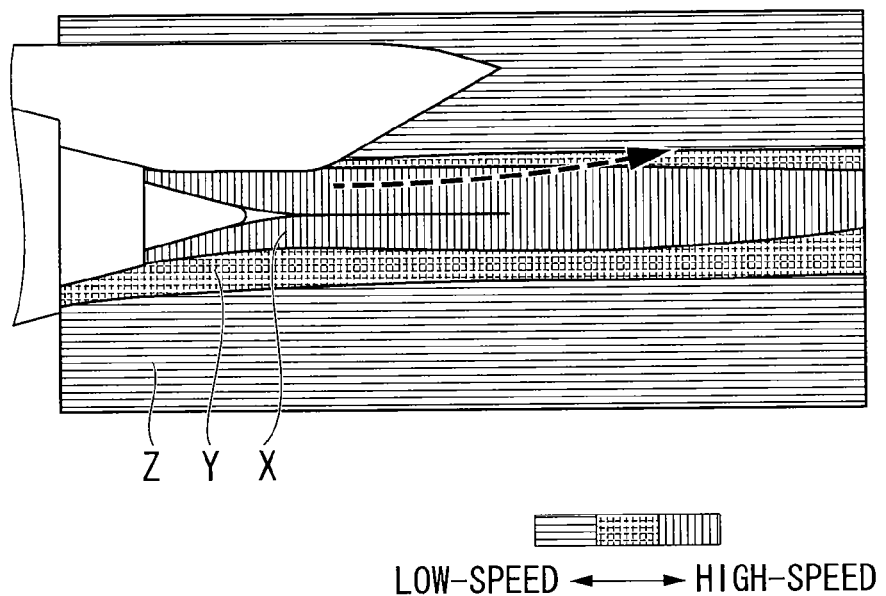
FIG. 6 is a pattern view that shows the core stream, a bypass stream, and an ambient air stream that are discharged from a conventional jet engine.

Next, a third embodiment shall be described with reference to FIG. 4 and FIG. 5.

Note that those constituent elements that are the same as in the other embodiments above are denoted by the same reference numerals, and descriptions thereof are omitted.

The third embodiment and the first embodiment differ on the point of the pylon-caused noise reducing nozzles 16 of the jet propulsion system 22 and the noise reducing device 23 being arranged on a downstream end portion 3a of the cylindrical partition wall 3 in the vicinity of the pylon 8, instead of at the pylon 8.

That is, the pylon-caused noise reducing nozzles 16, together with the microjet nozzles 15, are disposed at symmetrical positions centered on an axial line C2 that is perpendicular to the central axis line C1 of the casing 2 and the cylindrical partition wall 3 so as to be concentrated in the vicinity of the pylon 8. Note that the pylon-caused noise reducing nozzles 16 are pointed at the mixing layer S in the same manner as the other embodiments, unlike the microjet nozzles 15.

According to this jet propulsion system 22 and the noise reducing device 23, even if the pylon-caused noise reducing nozzles 16 are not disposed on the pylon 8, it is possible to disperse the turbulence of the mixing layer S by injecting air from the downstream end portion 3a of the cylindrical partition wall 3 into the mixing layer S.

Note that the technical scope of the present invention is not limited to the aforementioned embodiments, and various changes can be made without departing from the scope of the present invention.

For example, in the aforementioned embodiments, the noise reducing device is provided with the microjet nozzles 15, but it may also be provided with another means, provided it reduces the noise that is generated by the merging of the core stream X and the bypass stream Y. Also, a portion of the air discharged from the compressor 4 is injected, but it is also possible to supply air from another supply means, and moreover, it is not limited to air, and may be a liquid such as water.

Also, the air supply to the microjet nozzles 15 and the pylon-caused noise reducing nozzles 16 may consist of individual supply channels or a supply channel that is branched midway. Moreover, when supplying air to the microjet nozzles 15 and the pylon-caused noise reducing nozzles 16 individually, the timing of the injection may be staggered.

Also, the pylon is not limited to being on the lower side of the wing of an airplane, and may be disposed projecting in a horizontal direction or upward direction.

Industrial Applicability

According to the present invention, it is possible to favorably reduce the noise produced by the connection of a jet engine to the wing of an airplane via a pylon.

The invention claimed is:

1. A noise reducing device in a jet engine that has a cylindrical casing positioned to have a longitudinal extent along a central axis line and having a trailing edge, a cylindrical partition wall inside the cylindrical casing while protruding partially from the trailing edge of the cylindrical casing, and a compressor that compresses air that is taken into the cylindrical partition wall, with an inside of the cylindrical partition wall configured as a duct for a flow of a core stream of high-speed air exiting at a core stream discharge outlet, and a space between the cylindrical partition wall and the cylindrical casing configured as a duct for a flow of a bypass stream of low-speed air, and a pylon connecting the jet engine to a wing of an airplane, the pylon having a projection portion that includes a downstream end portion positioned so as to be stream further aft along the central axis direction than the core stream discharge outlet, the noise reducing device comprising:

a nozzle directly attached to the downstream end portion of the projection portion of the pylon, the nozzle positioned and configured to inject a fluid toward a noise generation source, a noise produced from a mutual approach of an ambient air stream that is produced outside of the bypass stream and the core stream of high-speed air.

2. The noise reducing device according to claim 1, wherein the nozzle is arranged at an opposing portion to an engine rotational central axis in the projection portion of the pylon.

3. The noise reducing device according to claim 1, wherein the fluid that is injected from the nozzle is air that is supplied from the compressor to the nozzle.

4. A jet propulsion system comprising:

a jet engine comprising a cylindrical casing having a downstream end portion;

a cylindrical partition wall positioned inside the cylindrical casing while protruding partially from the downstream end portion of the cylindrical casing;

a compressor positioned and configured to compress air that is taken into the cylindrical partition wall, with an inside of the cylindrical partition wall positioned and configured as a duct configured to lead a flow of high-speed core stream, and a space between the cylindrical partition wall and the cylindrical casing is positioned and configured as a duct configured to lead a flow of low-speed bypass stream;

a pylon that has a projection portion that includes a downstream end portion positioned so as to be beyond the cylindrical casing and downstream of the core stream and the bypass stream, the pylon positioned and configured to connect the cylindrical casing and a wing of an airplane; and a noise reducing device according to claim 1.

\* \* \* \* \*